United States Patent [19]

Anders

[11] 4,167,339

[45] Sep. 11, 1979

[54] SCREW COMPRISING A PLURALITY OF HOLLOW SCREW COMPONENTS JUXTAPOSED IN END-TO-END RELATION

[75] Inventor: Dietmar Anders, Hannover-Kleefeld, Fed. Rep. of Germany

[73] Assignee: Hermann Berstorff Maschinenbau GmbH, Hannover-Kleefeld, Fed. Rep. of Germany

[21] Appl. No.: 585,744

[22] Filed: Jun. 11, 1975

[30] Foreign Application Priority Data

Dec. 3, 1974 [DE] Fed. Rep. of Germany ....... 2457016

[51] Int. Cl.² .............................................. B29B 1/06
[52] U.S. Cl. ..................................................... 366/79
[58] Field of Search ................ 259/191, 192, 193, 97; 425/204, 205, 207, 208, 209; 403/300, 359

[56] References Cited

U.S. PATENT DOCUMENTS

| | | | |
|---|---|---|---|
| 2,946,089 | 7/1960 | Heston | 259/191 |
| 3,239,882 | 3/1966 | Yokana | 259/191 |
| 3,305,894 | 2/1967 | Boden et al. | 259/192 |
| 3,509,601 | 5/1970 | Johansson | 259/191 X |
| 3,588,154 | 6/1971 | Voight et al. | 403/359 |
| 3,690,623 | 9/1972 | Boyne | 259/192 |

*Primary Examiner*—Charles E. Phillips
*Attorney, Agent, or Firm*—Donald D. Jeffery

[57] ABSTRACT

A screw, particularly an extruder screw for rubber or plastics materials, comprising a plurality of hollow screw components juxtaposed in end-to-end relation, a coupling sleeve disposed over the or each joint between two adjacent screw components, each end of each screw component which is joined to another screw component having axially extending external splines on an external face thereof and the or each coupling sleeve having axially extending internal splines on an internal face thereof to engage with the external splines on the ends of the screw components to secure the screw components and the coupling sleeve or sleeves against relative rotation, and means, preferably a bolt coupling end members of the screw, to secure the screw components and coupling sleeve or sleeves against relative axial movement.

2 Claims, 3 Drawing Figures

SCREW COMPRISING A PLURALITY OF HOLLOW SCREW COMPONENTS JUXTAPOSED IN END-TO-END RELATION

The invention relates to a screw comprising a plurality of hollow screw components juxtaposed in end-to-end relation.

Such a screw is particularly suitable for use in a rubber or plastics extruder.

German Utility Model No. 69 15 822 discloses a multiple-component screw with hollow screw components in which these components are in the form of a splined hub. A splined shaft engages in the hub to transmit the torque. The shaft extends from the first screw component to the last. When one considers that screws 15 meters long and more are now no rarity in the extruding art, the manufacture of a suitable splined shaft can be seen to involve a large industrial outlay and to necessitate using special machines.

Another serious drawback of the construction described is that all the screw components located between the ends of the screw have to be constructed throughout as a spline hub. However, it is technically even more difficult to machine an internal diameter than an external one, particularly as in long screws the individual components must not be too short, so that an appropriate number of components is not exceeded. Too large a number of short components would reduce the stability of the screw and involve additional outlay on manufacture and additional assembly work.

If, in use, plasticised material passes into the splines in a multiple-component screw of the kind described above, it is difficult to pull-off the screw components, particularly those which must be pulled over the whole length of the spline shaft. Material which has passed into the splines also causes corrosion, and when the corroded screw component is pulled-off over the whole length of the splined shaft this may lead to erosion between the splined shaft and the splined hub and thus cause the hub to seize up.

According to the invention there is provided a screw comprising a plurality of hollow screw components juxtaposed in end-to-end relation; a coupling sleeve disposed over the or each joint between two adjacent screw components, each end of each screw component which is joined to another screw component having axially extending grooves in an external face thereof and the or each coupling sleeve having axially extending ribs on an internal face thereof to engage in the grooves in the ends of the screw components to secure the screw components and the coupling sleeve or sleeves against relative rotation; and means to secure the screw components and the coupling sleeve or sleeves against relative axial movement.

A screw according to the invention can be produced with considerably less manufacturing work than that necessary to produce a full length splined shaft and screw components internally splined over their full length without significantly reducing the torque transmitting performance of the screw.

As the screw components are connected by a coupling sleeve or sleeves which fits or fit around their ends, no internal machining of the screw components is necessary and external machining is only required over a short length at each end.

The screw of the invention may be an extruder screw for rubber or plastics material and the outer surfaces of the coupling sleeves may be provided with bosses, e.g. screw webs, which control the flow of the material to be processed. By varying the construction of the bosses and the arrangements for simple exchangeability of the sleeves, the screw can be individually adapted to each material which has to be processed and will thus help to improve the quality of the final product.

The invention makes it possible for the screw components each to have the same length as a respective surrounding section of screw cylinder and thereby facilitates assembly and dismantling of the screw extruder.

The invention is diagrammatically illustrated by way of example in the accompanying drawings, in which.

Figure 2:
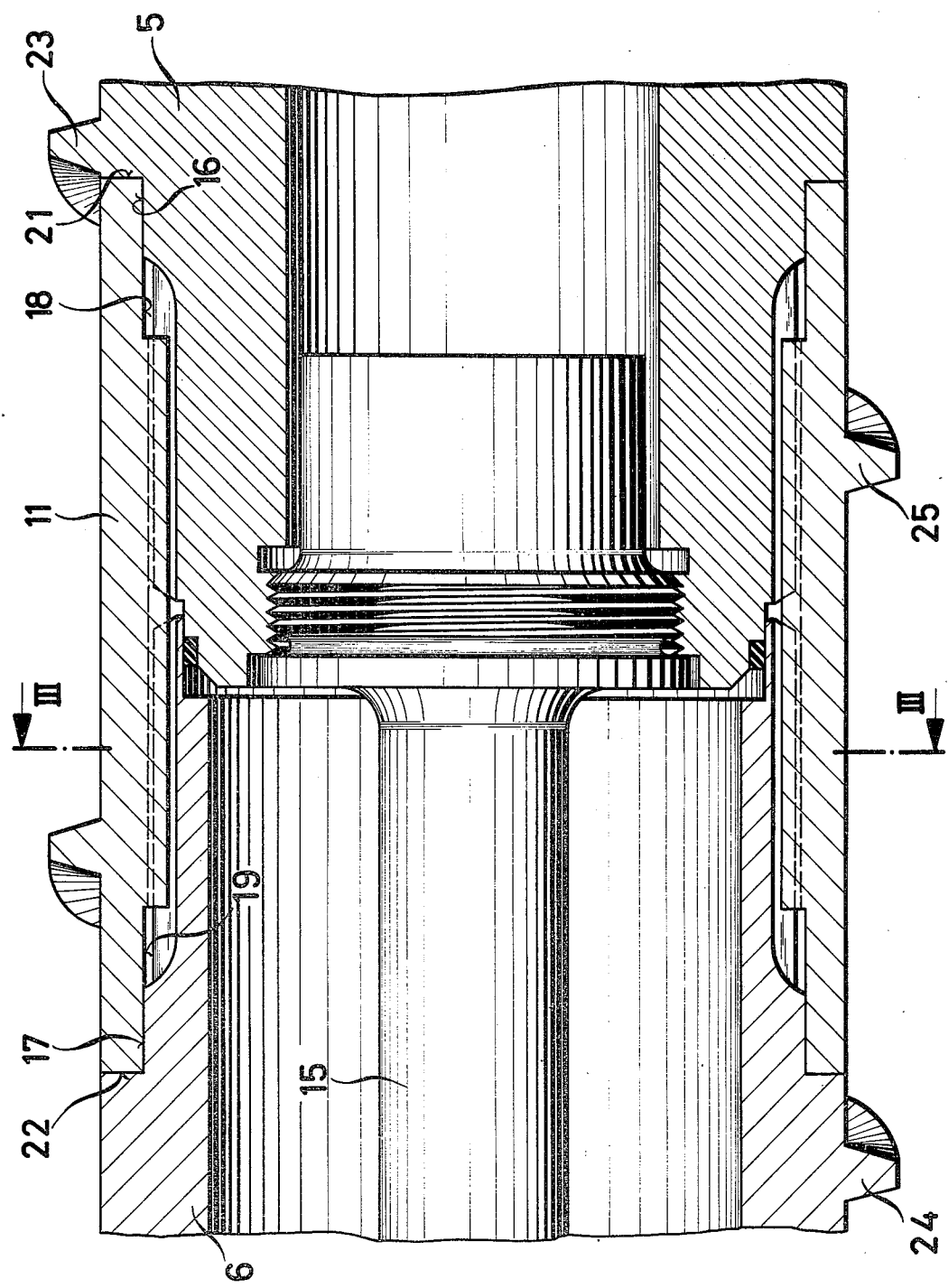
FIG. 2 is a fragmentary longitudinal section to a greater scale of the junction between two components of the screw of FIG. 1.

Referring to the drawings, a multiple-component screw 4 is made up from five hollow juxtaposed screw components 5 to 9. The screw components 5 to 9 are secured together at their junction positions by coupling sleeves 11 to 14 which fit around the ends of the screw components and prevent them from rotating relative to one another. A tie rod 15 (indicated in FIG. 2) which is screwed into the end screw component 5 and is braced resiliently in the other end component 9 pulls the end faces of the coupling sleeves 11 to 14 against the screw components 5 to 9.

Figure 1:
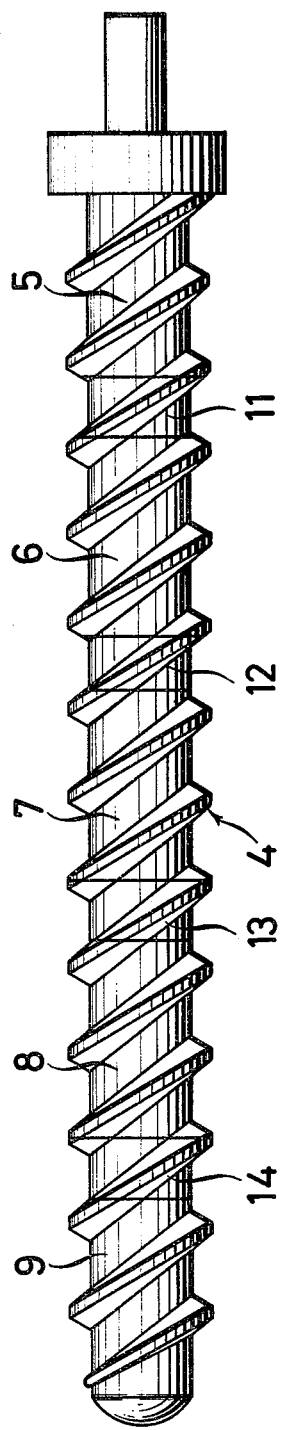
FIG. 1 is a simplified elevation of a multiple-component screw according to the invention with five components.
Figure 3:
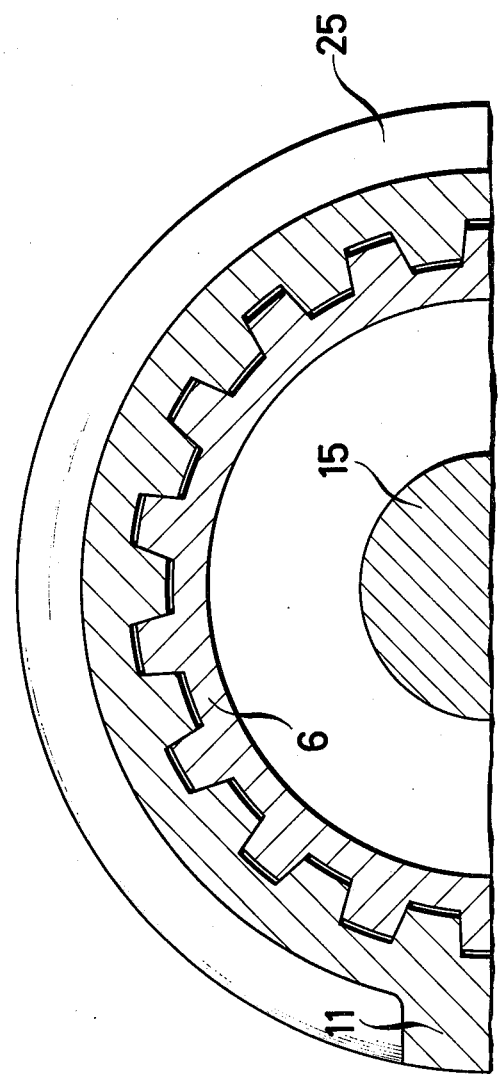
FIG. 3 is a section taken on line III—III of FIG. 2.

The end component 5 of the screw has a recess machined therein to form a cylindrical face 16 (FIG. 2) at the outer periphery of the end facing towards the next screw component 6. External splines are machined into the face 16 over the greater part of its length. The adjacent end of the next screw component 6 is constructed in the same way, that is to say with a face 17 with external splines machined therein. The ends of the two components 5 and 6 are surrounded by a coupling sleeve 11 which is formed with internal splines. The splines in the faces 16 and 17 at the ends of components 5 and 6 engage with the splines of the coupling sleeve 11 as shown in FIG. 3. The splines on the sleeve 11 do not extend over the entire internal length of the latter. The coupling sleeve 11 is bored out internally at the ends to form smooth cylindrical bores 18 and 19 which lie on the non-splined parts of the faces 16 and 17 respectively and centre the components 5 and 6. End faces 21 and 22 of the sleeve 11 lie against annular shoulders on the components 5 and 6, formed by machining the recesses to form the faces 16 and 17 respectively. The screw components are secured against relative axial movement by the tensioned tie rod 15.

The junctions between the screw components 6 and 7, 7 and 8, and 8 and 9 are constructed as described above for the junction between the screw components 5 and 6.

The screw components 5 and 6 have screw webs 23 and 24 respectively thereon and these are bridged by an appropriately shaped screw web 25 on the coupling sleeve 11.

Alternatively outer surfaces of the coupling sleeves may, if desired, be left plain or be provided with cams, transverse webs or other resistance members.

The internal and external splines on the coupling sleeves 11 to 14 and on the ends of the screw components 5 to 9 respectively may, if desired, have other profiles and pitches to those shown.

What we claim is:

1. A screw for extruding rubber or plastics material comprising:
    at least three hollow screw components juxtaposed in end-to-end relation, each of said screw components having screw webs on the outer surfaces thereof and being formed with exterior axially extending splines and an annular recess adjacent said splines in the ends of said screw components;
    a coupling sleeve disposed over each joint between each adjacent screw components, said coupling sleeve being formed with axially extending splines on the internal face thereof which engage in the splines in the ends of said screw components to secure said screw components and said coupling sleeve against relative rotation, said coupling sleeve being further formed with cylindrical end faces which engage said annular recesses formed in the ends of said adjacent screw components, the exterior surface of said coupling sleeve being flush with the exterior surfaces of said screw components, and
    means to secure said screw components and said coupling sleeve against relative axial movement.

2. A screw as claimed in claim 1, further comprising a screw web on the outer surface of said coupling sleeve, and wherein said means to secure said screw components and said coupling sleeve against axial movement comprises a tensioned tie rod.

* * * * *